Jan. 24, 1961    E. C. HORTON    2,968,828
WINDSHIELD WIPER
Filed April 8, 1954
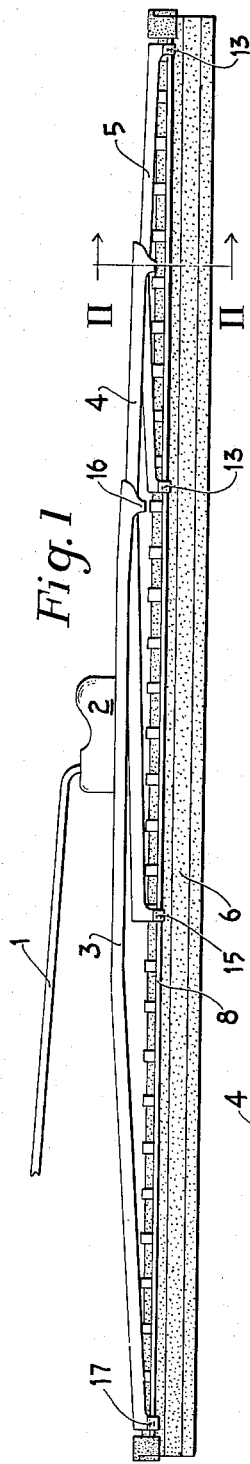
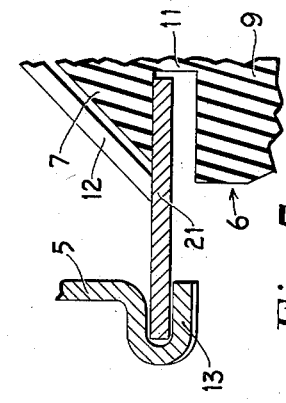
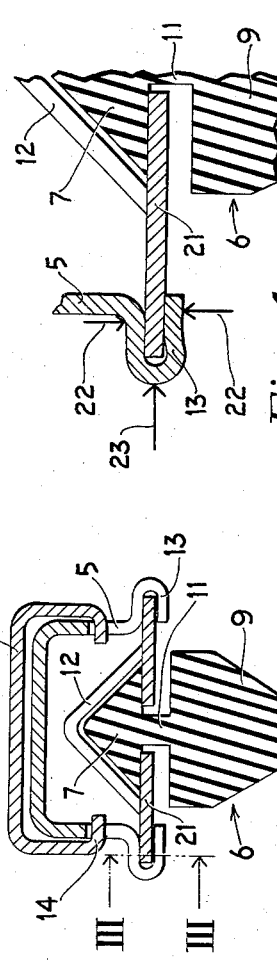
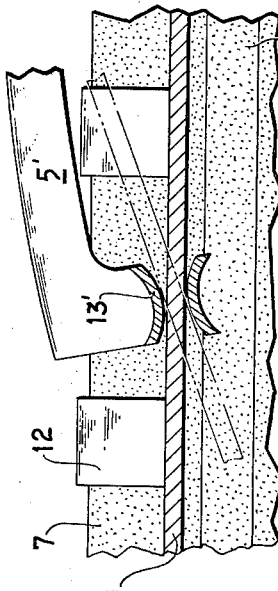
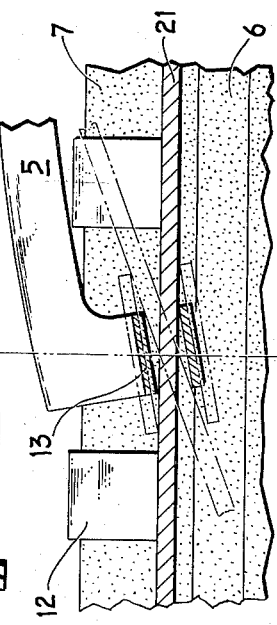
INVENTOR.
Erwin C. Horton
BY Bean, Brooks, Buckley & Bean
Attys.

United States Patent Office 2,968,828
Patented Jan. 24, 1961

2,968,828

WINDSHIELD WIPER

Erwin C. Horton, 43 Union St., Hamburg, N.Y.

Filed Apr. 8, 1954, Ser. No. 421,738

1 Claim. (Cl. 15—245)

This invention relates to a windshield wiper, and more particularly to a wiper adapted to clean curved windshield surfaces.

Heretofore those wipers adapted to clean curved windshields comprised rubber squeegees mounted in flexible backing strips. The strips were connected to a superstructure comprising a plurality of rigid yokes having a centrally located clip for attachment to the spring pressed actuating arm. The spring created pressure was transmitted to and distributed along the backing strip by the superstructure so as to cause the squeegee to conform to the curvature of the shield.

Since the surface contour of the shield changes from point to point, the wiper must be provided with sufficient flexibility to permit it to flex into conformity with the different degrees of curvature of the surface as it oscillates thereacross. In order to provide this requisite flexibility, the wipers were of necessity assembled in a loose jointed manner so as to permit a predetermined amount of relative movement between the various elements prior to binding. However, the apparently necessary looseness of fit which causes a considerable amount of noise in operation has been found to subject the operator of the vehicle and its passengers to excessive annoyance and distraction.

Accordingly, it is the object of the present invention to provide a windshield wiper which is silent in operation and yet has sufficient flexibility to permit its conformance to the constantly changing curvature of the shield during the cleaning cycle.

For a better understanding of this and other objects of the invention, reference is made to the following specifications and accompanying drawings wherein:

Fig. 1 is a side elevational view of a windshield wiper constructed in accordance with the instant invention;

Fig. 2 is a view taken on line II—II of Fig. 1;

Fig. 3 is a view taken on line III—III of Fig. 2 to an enlarged scale and somewhat exaggerated so as to clearly illustrate the saving in clearance made possible by the present invention;

Fig. 4 is a view taken on line IV—IV of Fig. 3 which in conjunction with Fig. 5 illustrates the manner in which the minimum clearance may be achieved; and Fig. 6 is a view similar to Fig. 3, but showing a modified form of the invention.

Referring now more particularly to the drawings, the numeral 1 designates the wiper actuating arm attached to clip 2 mounted on primary lever 3; the opposite end of the arm, not shown, is connected to the rockshaft of the wiper motor as is customary. The arm 1 is spring pressed toward the windshield in a conventional manner. The pressure resulting from the arm being urged toward the windshield is transmitted from it to the primary lever, from there to the secondary lever 4 and thence to the yoke 5.

The squeegee 6 comprises a triangular marginal bead 7 seated in a channel provided therefor in backing member 8. Neck 11 connects the marginal bead to the body 9 of the squeegee which tapers to a rectangular lip 10. The backing strip comprises two flanges 21 connected by arched cross-arms or vertebrae 12 spaced along the longitudinal axis of the backing strip. The vertebrae define the top boundary of the channel for the marginal bead and also provide the flexibility requisite to the backing strip for surface conformation as the wiper moves across the windshield. It should be noted that a limited amount of freedom of movement is permitted between the channel and the marginal bead in order that the squeegee may more readily make uniform contact with the windshield.

Claws 13 of the yoke engage flanges 21 of the backing strip while inturned ears 14 of the secondary lever engage the mid-point of the yoke. Claws 15 at the opposite end of the secondary lever also engage the flanges of the backing strip. Similarly, ears 16 and claws 17 of the primary lever engage the secondary lever and backing strip respectively.

From the above description it may be seen that as the arm exerts pressure on the primary lever the latter will tend to flatten and spread, the spreading being permitted by the sliding connection between the various elements. This action results in the transmission of pressure to the secondary lever and to the lower end of the backing strip so as to maintain firm contact between the squeegee and windshield in that area. Because of the pressure the secondary lever will flatten and concurrently rotate to a limited extent relative to the primary lever. The pressure applied to the secondary lever is transmitted to the backing strip and therefore to the squeegee at 15 and also to the yoke. Concurrently, the secondary lever will slide somewhat relative to the yoke which in turn tends to rotate as it applies the pressure to the squeegee via the backing strip at connections 13. It should be noted that the limited rotation of the various elements of the superstructure is an attenuated reflection of the movement of the squeegee as the latter flexes into conformity with the contour of the shield.

In Fig. 3 the full line representation indicates the configuration of the wiper as it passes over a flat portion of the shield, while the phantom section indicates, somewhat exaggerated for purposes of clarity, the position of the backing strip as the wiper passes over that section of the shield having maximum curvature. Additionally, the longitudinal dimension of the claws previously employed is indicated in phantom while the foreshortened claws of the present invention are shown in full lines. From a cursory inspection it may be seen that a considerable amount of clearance must be provided between the flanges of the backing strip and the claws of the superstructure in order to permit the strip to flex into conformity with the contour of the shield. Additionally, the clearance must be increased as the axial length of the claws is made larger.

As should be obvious, a large volume of operational noise occurs due to the impact of the various elements upon each other as the wiper oscillates across the shield. It has been found that a tighter clearance between the members will result in a great diminishment of the objectionable noise. The obvious manner in which to tighten the clearance would be to foreshorten the claws. However, the manufacturing tolerances necessary in previous methods of fabrication more than offset any gain in close clearance achievable by foreshortening the claws within practical limits. Accordingly, the method of fabrication of the instant invention, wherein the tolerances are absorbed in setting the clearance has been developed.

In the instant invention the wipers are assembled as was done previously. Subsequent to assembly, the claws are subjected to a two-way squeeze vertically and transversely as indicated by the arrows 22 and 23 in Fig. 4.

It should be noted that the claws on both sides of the backing strip are subjected to the squeeze simultaneously although for the purposes of simplicity only one side is depicted herein. The squeezing pressure is adjusted to a magnitude which is sufficiently high to insure maximum physical contact between the claws and backing strip in the area in which the pressure is applied. However, as may be seen from a close inspection of Fig. 4, the area of pressure application is sufficiently restricted inboard of the claws so as to prevent distortion excessively beyond the elastic limit of the material in the region of maximum curvature of the claws. Such excessive distortion would substantially eliminate any spring back of the claws after the release of pressure, and so lead to binding in operation. It is understood of course that if a tighter clearance is desired the area of pressure application may be extended. When the pressure is released the claws tend to spring back away from the flanges by a fixed amount due to the natural resiliency of the material. This is clearly illustrated in Figs. 4 and 5. In Fig. 4 the members are being subjected to the squeezing pressure and so are in close physical contact with the backing strip; while after the pressure has been released the claws tend to spring back, away from the flanges as shown in Fig. 5. Since the amount of spring back is fixed, depending upon the intrinsic characteristics of the material rather than the dimensions, all tolerances are absorbed by this process. It is only necessary to foreshorten the claws by an amount necessary to prevent binding within the fixed clearance derived from the spring back of the material employed. It should be realized however that the amount of foreshortening has a practical limit determined by the strength which must necessarily be imparted to the claws to afford a durable connection with the backing strip.

A modified form of construction is illustrated in Fig. 6. Herein the claws 13' on yoke 5' are of opposed arcuate configuration. With this mode of construction the intrinsic resiliency of the claws are greatly diminished. As a result, there will be only a slight spring back when the squeezing pressures are released. However, because of the arcuate shape of the claws only a negligible clearance is necessary to prevent binding as is clearly illustrated in Fig. 6. This configuration, therefore, makes possible an absolute minimum operational clearance.

It may therefore be seen that wipers thus formed have an accurately controlled, tailored to measure clearance between the members that are thus interlocked. This clearance is automatically controlled in spite of any dimensional variations in either or both parts because the parts which are compelled to function relative to each other are themselves used to determine the clearance needed for proper functioning. Each assembly is automatically adjusted in its working position to just the right amount of clearance for its proper functioning in spite of any variations resulting from manufacturing tolerances. Because of the minimum clearance so achievable the operational noise created by the relative movement between the back strip and superstructure is greatly diminished.

Having thus disclosed exemplary embodiments thereof what I claim as my invention is:

A windshield wiper for automotive vehicles having curved windshields comprising, a squeegee, a flexible backing strip for retaining said squeegee, said backing strip flexing into conformity with the different curvatures of an associated windshield as it moves thereacross, and a pressure distributing superstructure adapted for connection to an actuating arm and to said backing strip, said superstructure having a plurality of opposed transversely arcuate claws for engaging the backing strip, said arcuate claws having their convex surfaces positioned for engagement with the adjacent opposite faces of the backing strip, the radius of curvature of said arcuate claws being the practical minimum usable consistent with the strength and rigidity necessary for proper connection with the backing strip in order to permit the unrestrained flexing of said strip.

References Cited in the file of this patent

UNITED STATES PATENTS

| | | |
|---|---|---|
| 2,757,403 | Krohm | Aug. 7, 1956 |
| 2,781,539 | Oishei | Feb. 19, 1957 |
| 2,782,442 | Krohm | Feb. 26, 1957 |
| 2,782,448 | Anderson | Feb. 26, 1957 |
| 2,782,449 | Anderson | Feb. 26, 1957 |

FOREIGN PATENTS

| | | |
|---|---|---|
| 487,846 | Canada | Nov. 4, 1952 |
| 683,375 | Great Britain | Nov. 26, 1952 |

OTHER REFERENCES

Anderson Publication, pages 2 and 3, Nov. 1, 1946.